US012674333B2

(12) United States Patent
Limbach

(10) Patent No.: US 12,674,333 B2
(45) Date of Patent: Jul. 7, 2026

(54) HAND TOOL WITH HANDLE

(71) Applicant: Protools Holding B.V., Velddriel (NL)

(72) Inventor: Dominik Limbach, Pulheim (DE)

(73) Assignee: Protools Holding B.V. (NL)

( * ) Notice: Subject to any disclaimer, the term of this patent is extended or adjusted under 35 U.S.C. 154(b) by 444 days.

(21) Appl. No.: 18/082,690

(22) Filed: Dec. 16, 2022

(65) Prior Publication Data

US 2023/0193639 A1 Jun. 22, 2023

(30) Foreign Application Priority Data

Dec. 17, 2021 (EP) .................................... 21215720

(51) Int. Cl.
*E04F 21/16* (2006.01)
*B25G 1/10* (2006.01)

(52) U.S. Cl.
CPC .............. *E04F 21/161* (2013.01); *B25G 1/10* (2013.01)

(58) Field of Classification Search
CPC ....... E04F 21/16; E04F 21/161; E04F 21/162; E04F 21/163; E04F 21/165; B25G 1/00; B25G 1/102; B25G 1/10; B25G 3/00
USPC ...... 16/431, 436; 76/101.1–119; 30/169–172
See application file for complete search history.

(56) References Cited

U.S. PATENT DOCUMENTS

| | | | | |
|---|---|---|---|---|
| 961,302 A * | 6/1910 | Linville | E04F 21/24 | 15/235.8 |
| 1,024,559 A * | 4/1912 | Currence | E04F 21/24 | 15/235.8 |
| 3,460,183 A * | 8/1969 | Harrington | E04F 21/06 | 403/384 |
| 6,205,610 B1 * | 3/2001 | Westthorp | E04F 21/02 | 15/236.08 |
| 6,223,384 B1 * | 5/2001 | Kuhlen | B25G 3/26 | 15/235.4 |
| 6,247,204 B1 | 6/2001 | Hamby et al. | | |
| 6,543,549 B1 * | 4/2003 | Riedl | B25F 5/02 | 173/171 |
| 6,604,256 B1 * | 8/2003 | Pytlewski | E04F 21/161 | 15/245.1 |
| 8,434,188 B1 | 5/2013 | Jimenez et al. | | |
| 9,891,019 B2 | 2/2018 | Haas et al. | | |
| 11,207,762 B2 | 12/2021 | Lownik et al. | | |
| 2005/0235447 A1 * | 10/2005 | Wang | E04F 21/161 | 15/235.4 |
| 2008/0014412 A1 | 1/2008 | Hortnagl et al. | | |
| 2014/0083260 A1 | 3/2014 | Kundracik et al. | | |
| 2014/0183887 A1 * | 7/2014 | Wyles | A01B 1/16 | 294/118 |

(Continued)

FOREIGN PATENT DOCUMENTS

| | | | |
|---|---|---|---|
| DE | 93 10 980 U1 | 9/1993 | |
| DE | 20 2015 103807 U1 | 8/2015 | |
| DE | 11 2016 004611 T5 | 6/2018 | |

(Continued)

OTHER PUBLICATIONS

'Web'. Google's English Dictionary [online]. [Retrieved on Jan. 8, 2025]. Retrieved from the internet: <https://www.google.com/search?q=web+defintion>. (Year: 2025).*

*Primary Examiner* — Shay Karls
(74) *Attorney, Agent, or Firm* — FBT Gibbons LLP

(57) ABSTRACT

The invention pertains to a hand tool with a handle portion and a method for manufacturing the same.

11 Claims, 2 Drawing Sheets

(56) References Cited

U.S. PATENT DOCUMENTS

| | | | | | |
|---|---|---|---|---|---|
| 2018/0021935 | A1 * | 1/2018 | Blouin | ..................... | B25G 1/10 16/110.1 |

FOREIGN PATENT DOCUMENTS

| | | | | | | |
|---|---|---|---|---|---|---|
| GB | 2342306 | A | * | 4/2000 | ............. | B25G 1/102 |
| IT | 2019 0001 8095 | A1 | | 4/2021 | | |
| JP | 2011006282 | | | 1/2011 | | |
| TW | 418761 | U | | 1/2001 | | |
| WO | WO 2019/0167529 | A1 | | 6/2019 | | |
| WO | WO-2021038015 | A1 | * | 3/2021 | ................ | B25F 5/02 |

* cited by examiner

HAND TOOL WITH HANDLE

PRIORITY

This application claim priority to European Patent Application No. 21215720.0, entitled "Hand Tool with Handle," filed on Dec. 17, 2021, the disclosure of which is incorporated by reference herein.

The invention pertains to a hand tool with a handle portion and a method for manufacturing the same.

Hand tools with handles and in particular trowels such as smoothing trowels have already been known. Existing hand tools are disadvantageous in that they are very heavy, especially due to the use of metals such as steel or aluminum. Smoothing trowels of the prior art usually comprise a blade, a base, a web and a handle portion on which usually a handle is screwed, pressed or clamped. The base, the web and the handle portion are often referred to as a support.

WO2019167529A1 describes pliers, the parts of which can partly consist of a carbon fiber reinforced epoxide resin. The working parts such as the jaws are made of steel.

JP11006282A describes a concrete trowel comprising a long and wide base portion and a central support neck. The trowel blade may contain carbon fibers.

TW418761U describes a one-piece hand tool, wherein the core is made from steel and said core may be provided with a coating of a carbon or glass fiber reinforced material.

Smoothing trowels of the prior art are disadvantageous in that the handle is connected to the blade by one or several necks such that the force exerted by the user's hand cannot be optimally transferred to the blade. Thus, the necks or the neck have previously each been arranged at the end of the handle and then directly connected to the blade more or less at a right angle, respectively. The handle, the base and the web and especially the neck, hence, altogether the support of trowels of the prior art are often made up of several pieces and from metal, which makes the trowels of the prior art difficult and more complicated to manufacture.

Until now, trowels have been manufactured by connecting one or two metal plates with the metal support and a press-fitted plastic handle. The metal support and the intermediate plate are often connected by welding using weld pins. Subsequently, the connection to the actual trowel blade is often additionally provided by an adhesive bond. Alternatively, the intermediate plate can be directly welded or adhesively bonded.

It is an object of the present invention to eliminate the disadvantages of the prior art. In particular, a weight reduction while maintaining the same or improved properties or also a finger protection are to be realized. Another object may be to shift the center of pressure rearwards for achieving a better pressure distribution on the support.

In a first embodiment, the object of the invention is achieved by a hand tool with a handle or a handle portion, wherein the handle or handle portion mainly consists of a carbon fiber reinforced plastic containing from 10 to 50 wt % of carbon fibers. The handle and possibly also the support made of such a material replace a handle or also the support made of aluminum or steel, for example. It has turned out that the claimed range of the carbon fiber content is optimal for obtaining a material with mechanical properties that can match those of aluminum or steel in hand tools.

Preferably, the handle has a handle portion (the support, for example) and possibly also a handle material wherein the handle material can cover the handle portion at least partially.

Preferably, the hand tool does not have relatively movable parts.

In addition to a handle, the hand tool may also have a web portion, a base portion and/or a blade, for example. Preferably, the handle or the handle portion is a part of a support. The handle may also be configured as a handle portion of a support. Preferably, the support comprises at least a base portion, a web portion and a handle portion. A handle material may be arranged around the handle portion for forming the handle, for example. The handle comprises a handle portion, for example. In addition to the handle portion, the handle may also comprise a handle material wherein the handle material is arranged at least partially around the handle portion, for example. Preferably, the hand tool may be a trowel and especially a smoothing trowel. Preferably, the hand tool is a trowel having at least a blade and a support wherein the support comprises a base portion, a web portion and a handle portion.

The handle within the meaning of the invention may also be the handle portion of the support. Preferably, the support within the meaning of the invention can comprise a base portion, a web portion and a handle portion.

The handle portion of the handle or the support can be connected to a base portion preferably by a web portion. The base portion, in turn, may be connected to the trowel blade. Preferably, at least a part of the handle or the handle portion, a part of the web portion and a part of the base portion are integrally connected to one another. Preferably, the handle portion, the web portion and the base portion are formed in one or two pieces. Especially preferably, the handle portion, the web portion and the base portion are formed in two pieces from two half-shells. These half-shells may be connected to each other (e. g., by bonding, welding, clamping and/or screwing), for example. Especially preferably, both half-shells are screwed together. Angled screw-on tabs may be provided for this purpose, for example. Preferably, the half-shells at least partially comprise a case lock for connecting the half-shells. Preferably, the half-shells are sealed watertight for preventing water from penetrating the cavity within the half-shells should the tool be left in water for a longer period of time. The sealing can also be achieved by the above-mentioned case lock or also by bonding or sealants.

The weight of both half-shells together is preferably in a range from 100 to 300 grams. The weight of the support is preferably in a range from 100 to 300 g. The weight of the hand tool is preferably in a range from 150 to 500 g.

Preferably, the half-shells are reinforced by ribs in their interior.

Preferably, the hand tool is integrally formed from several components, for example. This allows to construct the trowel blade from a material different from that of the handle and/or the handle portion.

Preferably, the handle and/or the handle portion may have a length in a range from 40 to 140% of the length of the base portion. Independently thereof, the handle and/or the handle portion may have a length in a range from 30 to 90% of the blade length. Preferably, the length of the handle and/or the handle portion may be in a range from 100 to 200 mm. Preferably, the maximum width of the handle or the handle portion may be in a range from 20 to 80 mm, especially in a range from 30 to 60 mm.

Preferably, the handle may have an exposed end. The handle and/or the handle portion may also have an end that is (integrally, for example) connected to the web portion. Preferably, the diameter of the handle and/or handle portion increases from the end connected to the web portion towards the exposed end by at least 10%, especially preferably by at least 20%. This prevents the tool such as the trowel, for example, from easily slipping out of the hand.

By adapting the handle geometry or the handle portion geometry a more economic handling of the hand tool such as the smoothing trowel, for example, could be achieved. In the course of the usage research it has been found that many different work movements can occur during usage. Examples include "wiping" or the planar pressing which will be explained below.

During "wiping" or plastering, the handle or handle portion is gripped between the ball of the thumb and the metacarpus or thumb basal joint. The goal of this operation is to continuously process an as large wall surface as possible. For this purpose a radial wipe movement is performed by shoulder and elbow movements. In order to be able to perform this operation even for longer periods, a firm grip of the smoothing trowel in the hand and a gentle thumb rest surface at the handle are especially crucial.

The web portion and/or the handle portion may be configured such that a thumb rest is formed.

The planar pressing of the hand tool such as the smoothing trowel, for example, serves for the targeted compression and the optical rework of local areas of the wall. Contrary to "wiping", not the quantity but the quality of the movement is crucial. In this process the handle of the smoothing trowel is usually loosely gripped by the hand from above. Then the trowel blade is moved parallel to the wall. For this movement, the conventional handle concept requires a bending of the wrist which is a permanent strain from an ergonomic perspective and can quickly result in fatigue. Therefore, the diameter of the handle and/or the handle portion preferably increases from the end connected to the web portion as described above, for example.

Preferably, the center of gravity (by weight) of the hand tool such as the trowel is in a range from the center +/−10% of the length of the hand tool in the longitudinal direction. Preferably, a projection line perpendicular to the blade extends through the base center and the handle center or, respectively, the center of the base portion and the center of the handle portion in the longitudinal direction +/−20% of the length of the hand tool. The advantage of these preferred embodiments over hand tools of the prior art is that the hand tool is well-balanced and therefore has an improved handleability. If the hand tool is a trowel such as a smoothing trowel, materials such as plaster can be smoothed much easier than with trowels of the prior art.

The center of pressure within the meaning of the invention is the point or area where the force of the user's hand is transmitted to the tool. This is usually the handle portion.

Preferably, the handle or handle portion 12 is at least partially covered by a handle material 32. Preferably, the handle material 32 is an elastic material. The handle material 32 may be a TPE (thermoplastic elastomer); leather, silicone or any combination of these materials, for example (TPE and leather, for instance). Holes 36 filled with the handle material 32 can be arranged in the handle portion 12 and/or the half-shells. Preferably, the diameter of the handle material 32 behind the holes 36 exceeds the respective hole diameter. The handle material 32 may also cover at least parts of the web portion 14. At least one rib 34 (one on each side of the handle portion 12, for example) may also be arranged on the handle portion 12. This has the advantage that the surrounding or sprayed-on handle material 32 cannot distort. Especially preferably, the inside of the web portion 14 is at least partially surrounded by the handle material 32. This serves as a finger protection, in particular of the index finger, that is often inflamed when using prior-art smoothing trowels due to the lack of protection.

Preferably, the handle or the handle portion has an end cap for striking purposes, for example, at its exposed end.

Preferably, the hand tool has only one handle and/or handle region (and not several handles such as pliers, for example).

The handle or handle portion can be connected to a base portion by a web portion. Preferably, the web portion has an average circumference of from 30 to 130 mm. Preferably, the web portion has a length in a range from 30 to 100 mm. Preferably, the web portion extends from one end of the handle to the base portion. The web portion is connected to the base portion in a range of from +15% to −15% of the center of the base portion length. When viewed from the side, the range of the connection between the base portion and the web portion is below the handle or handle portion and is preferably away from the outermost extension of the handle or handle portion in the longitudinal direction of the handle or handle portion by 10% of the length of the handle or handle portion.

Preferably, the base portion may have a length in a range from 100 to 500 mm, especially in a range from 120 to 360 mm. Preferably, the base portion may have a width in a range from 20 to 100 mm, especially preferably in a range from 30 to 60 mm.

The base portion may have an open structure, in particular a rib or a honeycomb structure, on its side facing the blade. This allows to prevent a distortion of the base portion during manufacture by injection molding especially well.

Alternatively, in particular applications (plaster finishing/Venetian trowels, for example) the base portion may also be shorter and have a length in a range from 40 to 200 mm, for example.

The base portion or the half-shells, on the one hand, and the blade, on the other hand, are preferably bonded to one another, especially by a liquid adhesive. This has the advantage that screw connections or weld pins as in the state of the art can be dispensed with. Preferably, an adhesive layer (a liquid adhesive made from an acrylate material or polyurethane-based, for example) or an adhesive tape (a double-sided acrylic adhesive tape, for example) is arranged between the base portion and the blade. Preferably, the adhesive layer is flexible. Preferably, the adhesive of the adhesive layer is a single-component adhesive. Preferably, the adhesive is a polyurethane-based adhesive. Preferably, the blade and the base portion or the half-shells are floatingly bonded. Preferably, no intermediate plate is arranged between the base portion and the blade. Preferably, the adhesive layer or the adhesive tape may have a thickness in a range from 0.1 to 5 mm, especially preferably a thickness in a range from 0.5 to 2 mm. Alternatively, the base portion or the half-shells, on the one hand, and the blade, on the other hand, may also be welded to each other.

At the longitudinal edges, the base portion is preferably at a distance in a range from 0 to 0.5 mm from the blade. Along the center line in the longitudinal direction, the base portion is preferably at a distance in a range from 0.5 to less than 3 mm from the blade.

In the outermost 10% of the length, the thickness of the base portion in the longitudinal direction is, on average, at most 70% of the thickness in the center of the base portion. This allows a more even distribution of the force from the handle or the handle portion and the web portion across the complete base portion.

Preferably, the blade width is in a range from 8 to 50 cm, especially preferably in a range from 10 to 30 cm. Preferably, the blade length is in a range from 15 to 80 cm, especially preferably in a range from 20 to 50 cm. Preferably, the blade thickness is in a range of 0.2 to 2 mm. The blade is preferably one piece and especially not assembled from several parts.

Preferably, the handle or handle portion contains from 20 to 40 wt % of carbon fibers. Preferably, the handle or handle portion may also contain from 50 to 90 wt %, particularly preferably from 60 to 80 wt % of plastic. The handle or handle portion may also comprise from 1 to 15 wt % of metal (e. g., due to screws), for example. The low metal content and hence the low heat conduction due to the low metal content ensure that the hand tool user can hold the handle or the handle portion even when the hand tool accidentally contacts hot objects. Preferably, the handle or the handle portion is made of a different material than the blade.

Preferably, more than 50 wt % of the material of the handle or the handle portion is arranged in the outermost 5 mm, calculated from the outer surface of the handle. Preferably, the support is internally at least partially hollow. Especially preferably, the cavity within the support comprises a range from 20 to 90% by vol.

Preferably, the web portion contains from 20 to 40 wt % of carbon fibers. Preferably, the web portion may also contain from 50 to 90 wt %, particularly preferably from 60 to 80 wt % of plastic. The web portion may also comprise from 1 to 15 wt % of metal (e. g., due to screws), for example. Preferably, the web portion is made of a different material than the blade.

Preferably, the base portion contains from 20 to 40 wt % of carbon fibers. Preferably, the base portion may also contain from 50 to 90 wt %, particularly preferably from 60 to 80 wt % of plastic. The base portion may comprise from 1 to 15 wt % of metal (e. g., due to screws), for example. Preferably, the base portion is made of a different material than the blade.

Preferably, a half-shell contains from 20 to 40 wt % of carbon fibers. Preferably, a half-shell may also contain from 50 to 90 wt %, particularly preferably from 60 to 80 wt % of plastic. A half-shell may also comprise from 1 to 15 wt % of metal (e. g., due to screws), for example. Preferably, a second shell-half has the same preferred composition.

Preferably, more than 50 wt % of the material of both half-shells assembled to form the handle, the web portion and the base portion is arranged in the outermost 5 mm, calculated from the outer surface of the assembled half-shells.

Preferably, the support contains from 20 to 40 wt % of carbon fibers. Preferably, the support may also contain from 50 to 90 wt %, particularly preferably from 60 to 80 wt % of plastic. The support may also comprise from 1 to 15 wt % of metal (e. g., due to screws), for example. Preferably, the support is made of a different material than the blade.

The plastic is preferably selected from polyvinyl chloride, polypropylene, polyethylene, thermoplastic elastomers (TPE), polyamide and combinations, mixtures and copolymers thereof. Particularly preferably, the plastic is a polyamide. Taken together, the polyamide monomers preferably have between 5 and 15 carbon atoms in the backbone. The polyamide may consist of one monomer or two or three different monomers, for example.

Preferably, the melting temperature of the handle material and/or the plastic is in a range from 150 to 350° C., particularly preferably in a range from 210 to 300° C. This can ensure that the hand tool is not damaged even during a short contact with hot objects on a construction site.

Preferably, the tensile modulus of the handle material and/or the plastic is in a range from 10,000 to 30,000 MPa. The tensile modulus can be measured according to ISO 527 at 1 mm/minute. This can ensure that the handle can resist also high mechanical stresses.

The strain at break of the handle material and/or the plastic is preferably in a range from 1 to 5%. The strain at break can be measured according to ISO 527, for example.

The handle or handle portion, the web portion, the base portion and/or the half-shells are preferably made of an injection molding material.

Preferably, the blade consists of metal or plastic, particularly preferably of steel. The plastic can correspond to preferred embodiments of the handle portion.

In another embodiment the object of the present invention is achieved by a method for manufacturing the hand tool according to the invention, characterized in that at least the handle or the handle portion is formed from two injection-molded half-shells, these two half-shells are non-positively connected and then connected to a metal part of the hand tool.

Preferably, the hand tool is a trowel. Preferably, the metal part is a trowel blade. Preferably, the handle or handle portion, the web portion and the base portion are formed from both two injection-molded half-shells.

Further practical embodiments and advantages of the invention are described below in conjunction with the drawings. In the drawings.

The following description of the figures comprises concrete examples that pertain to preferred embodiments and are not meant to limit the scope of the invention. Some of the features described hereinafter or combinations thereof may serve to distinguish the invention from the prior art.

Figure 1:
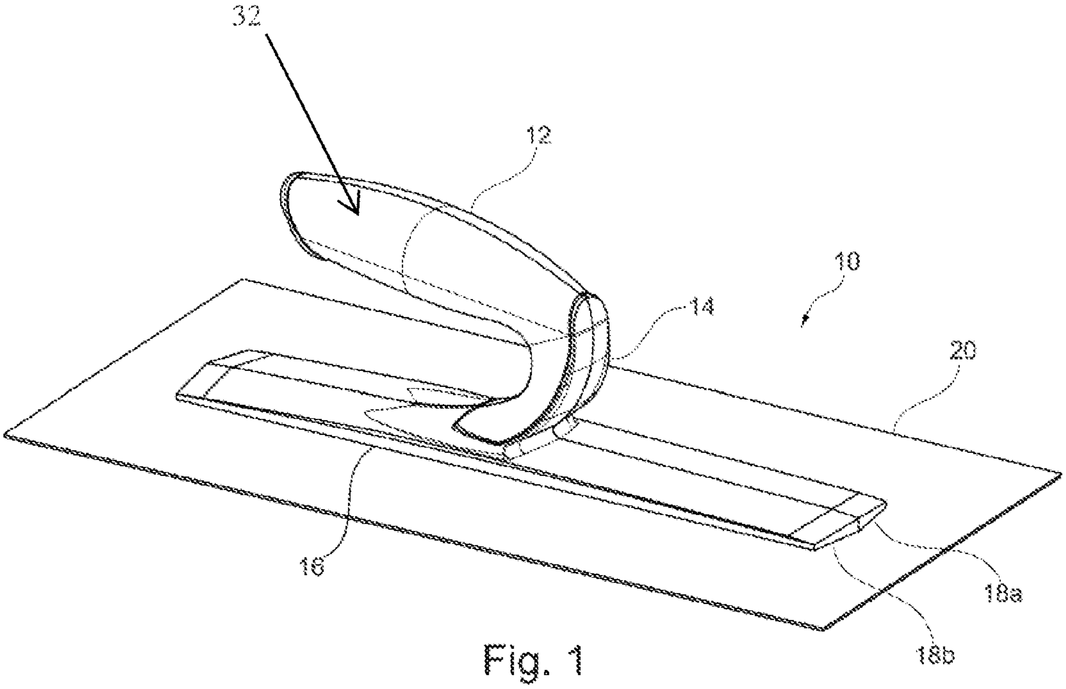
FIG. 1 shows the inventive hand tool

FIG. 1 shows, by way of example, a smoothing trowel 10 as a hand tool according to the invention. A handle portion 12 with a web portion 14 and a base portion 16 is formed from two half-shells 18*a* and 18*b*. Hence, half of the handle 12, the web portion 14 and the base portion 16, respectively, are integrally connected to one another in the form of a respective half-shell 18*a* and 18*b*. The base portion 16 is bonded to the blade 20. The half-shells 18*a* and 18*b* can be screwed together.

Figure 2:
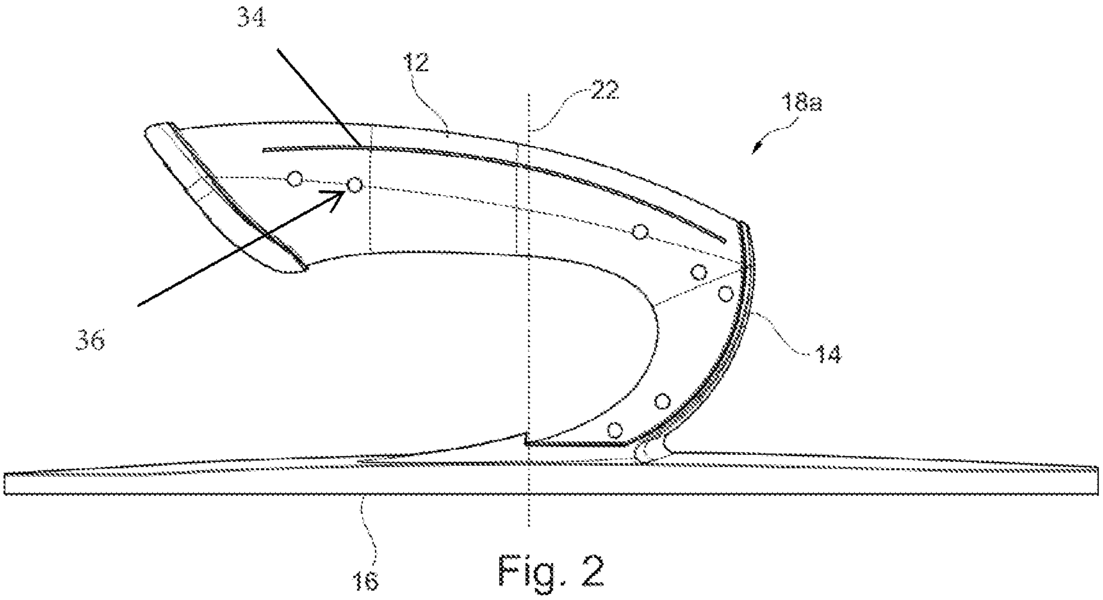
FIG. 2 shows the side elevational view of a half-shell

FIG. 2 shows, by way of example, a half-shell 18*a*. The part of the half-shell 18*a* forming one half of the handle 12 is shown. The part of the half-shell 18*a* forming one half of the web portion 14 is shown. And the part of the half-shell 18*a* forming one half of the base portion 16 is shown. Twenty-two refers to the projection line that extends perpendicular to the blade near the center of the base portion and near the center of the handle portion.

In this example, the handle portion 12, the web portion 14 and the base portion 16 together form the support within the meaning of the invention.

The features of the invention disclosed in the present description, in the drawings as well as in the claims both individually and in any combination may be essential to the realization of the various embodiments of the invention. The invention is not limited to the described embodiments. It may be varied to the extent as falls into the scope of the invention, taking into account the knowledge of one skilled in the art.

REFERENCE SIGN LIST

10 Hand tool

12 Handle

14 Web portion
16 Base portion
18*a*, 18*b* Half-shells
20 Blade
22 Projection line

I claim:

1. A hand tool comprising a trowel including a handle portion, a web portion, a base portion, and a blade, wherein the base portion directly connects with the blade, wherein the handle portion, the web portion and the base portion are formed from two half-shells, wherein the handle portion comprises mainly a carbon fiber reinforced plastic containing from 10 to 50 wt % of carbon fibers, wherein the web portion contains from 20 to 40 wt % of carbon fibers, wherein the base portion contains from 20 to 40 wt % of carbon fibers, wherein a combined weight of both half-shells is in a range from 100 to 300 grams, wherein the handle portion has an exposed end, wherein a diameter of the handle portion increases from an end connected to the web portion toward the exposed end by at least 10%, wherein when viewed from the side, a range of a connection between the base portion and the web portion is below the handle portion.

2. The hand tool according to claim 1, characterized in that the plastic is a polyamide.

3. The hand tool according to claim 1, characterized in that the handle portion contains from 1 to 15 wt % metal.

4. The hand tool according to claim 1, characterized in that at least one rib is arranged on the handle portion.

5. The hand tool according to claim 1, characterized in that the web portion has an average circumference from 30 to 120 mm.

6. The hand tool according to claim 1, characterized in that a projection line perpendicular to the blade that extends through a center of the base portion and a center of the handle portion are each located within +/−10% of a longitudinal center of the hand tool.

7. The hand tool according to claim 1, characterized in that the base portion is bonded to the blade.

8. The hand tool according to claim 1, characterized in that the base portion has a length in a range from 100 to 500 mm.

9. The hand tool according to claim 1, characterized in that the handle portion is at least partially covered by a handle material.

10. The hand tool according to claim 9, wherein one or more holes in the handle portion are filled with the handle material.

11. A method for manufacturing the hand tool according to claim 1, characterized in that at least the handle portion is formed from two injection-molded half-shells, the two half-shells are non-positively connected with each other and then connected to a metal part of the hand tool.

* * * * *